United States Patent [19]

McMillen et al.

[11] Patent Number: 4,560,003

[45] Date of Patent: Dec. 24, 1985

[54] SOLVENT STIMULATION IN HEAVY OIL WELLS PRODUCING A LARGE FRACTION OF WATER

[75] Inventors: James M. McMillen, Arlington; Lynn D. Mullins, De Soto, both of Tex.

[73] Assignee: Mobil Oil Corporation, New York, N.Y.

[21] Appl. No.: 693,229

[22] Filed: Jan. 22, 1985

Related U.S. Application Data

[63] Continuation of Ser. No. 420,418, Sep. 20, 1982, abandoned.

[51] Int. Cl.⁴ .............................................. E21B 43/25
[52] U.S. Cl. ................................................. 166/305.1
[58] Field of Search ................... 166/305 R, 304, 263

[56] References Cited

U.S. PATENT DOCUMENTS

| | | | |
|---|---|---|---|
| 2,258,614 | 10/1941 | Kendrick | 166/263 |
| 2,699,832 | 1/1955 | Allen | 166/304 |
| 2,865,453 | 12/1958 | Widmyer | 166/305 R |
| 3,032,499 | 5/1962 | Brown | 166/305 R |
| 3,283,818 | 11/1966 | Santourian | 166/305 R |
| 3,285,341 | 11/1966 | Parker | 166/305 R X |
| 3,308,885 | 3/1967 | Sandiford | 166/305 R X |
| 3,470,958 | 10/1969 | Kinney | 166/305 R |
| 3,525,400 | 8/1970 | Pollock et al. | 166/305 R |
| 3,554,289 | 1/1971 | Webb | 166/305 R |
| 3,978,926 | 9/1976 | Allen | 166/305 R X |

*Primary Examiner*—George A. Suchfield
*Attorney, Agent, or Firm*—Alexander J. McKillop; Michael G. Gilman; Stanislaus Aksman

[57] ABSTRACT

A method for the solvent stimulation of a well producing heavy oil containing large fractions of free water by injecting a solvent into the producing well, having a density and viscosity substantially less than the viscous formation oil and a viscosity equal to or slightly greater than water at formation conditions, shutting-in the producing well to allow a soak period, and returning the well to production with substantially less water production than prior to stimulation.

28 Claims, No Drawings

SOLVENT STIMULATION IN HEAVY OIL WELLS PRODUCING A LARGE FRACTION OF WATER

CROSS-REFERENCE TO RELATED APPLICATION

This is a continuation of copending application Ser. No. 420,418, filed on Sept. 20, 1982, now abandoned.

FIELD AND BACKGROUND OF THE INVENTION

1. Field of the Invention

This invention relates to a method for stimulating a production well producing oil having a large fraction of free water wherein a solvent is injected into the production well to displace water away from the well, shutting-in the production well to permit the formation surrounding the production well to undergo a soak period, and then opening the production well to production at an enhanced rate of production with substantially less water.

2. Background of the Invention

Repetitive stimulation of oil producing wells is a production practice of long standing. The phrase "cyclic stimulation" is often used to reflect anticipated production rate increases, the duration of which is relatively short as compared to the total life of the well. The cause of the production increase arises from either (1) an increase in pressure driving reservoir fluids toward the producing well, or (2) a decrease in resistance to flow of the fluids such as reduction in viscosity or removal of impediments to flow in the reservoir rock surrounding the well. The viscosity reduction may be achieved through use of a low viscosity fluid solvent and/or by increasing the temperature of the reservoir fluids and rock in the proximity of the reservoir.

This invention provides a method for the solvent stimulation of a production well producing oil containing large fractions of free water wherein production is enhanced and the oil recovered with substantially less water production than prior to stimulation.

SUMMARY OF THE INVENTION

The present invention relates to a method for stimulating the recovery of oil having a large fraction of free water flowing from a production well penetrating a subterranean, viscous oil containing formation comprising injecting a predetermined amount of a solvent into the production well to displace water away from the production well which solvent has a density and viscosity substantially less than the viscous formation oil and a viscosity equal to or slightly greater than water at formation conditions, shutting-in the production well to allow the formation around the production well to undergo a soak period whereby the solvent which has a density less than the viscous oil fingers upward under the influence of gravity dissolving in the oil reducing its viscosity, and opening the production well and recovering oil from the well with substantially less water production than prior to solvent injection. The amount of solvent injected is 2 to 30 and preferably 20 barrels per foot of productive formation thickness.

DESCRIPTION OF THE PREFERRED EMBODIMENT

The present invention contemplates solvent stimulation of a producing well penetrating a subterranean, viscous oil-containing formation that is producing oil containing a large fraction of free water, up to 98% by volume.

In carrying out the invention, a predetermined amount, 2 to 30 and preferably 20 barrels per foot of productive formation thickness, of a solvent having a density and viscosity substantially less than the viscous formation oil and a viscosity equal to or slightly more than water, is injected into a producing well which was previously producing oil containing a large fraction of free water, e.g. water which separates from the produced oil easily on standing. Free water, in the absence of obvious water zones on a log of the formation, is interpreted as coming from thin stringers of water bearing sand. The injected solvent radially invades the formation displacing this water away from the production well.

Following the injection period the production well is shut in for a predetermined soak time and then returned to production. The soak period will vary depending upon the characteristics of the formation and will vary from about 1 to about 10 days.

The steps of injecting a predetermined amount of solvent followed by a soak period and subsequent production may be repeated for a plurality of cycles until the fluids produced contain an unfavorable amount of water. In the case of repeated stimulations, the initial soak period is for 1 to 5 days and thereafter from about 5 to 10 days.

During the soak period, the injected solvent fingers upwardly by gravity dissolving in the viscous oil and reducing its viscosity thereby enhancing its recovery. The produced oil after injection of the solvent followed by a soak period contains only a small amount of water.

The injected solvent can be any gas or liquid that is miscible with the reservoir oil at the pressure and temperature at which it contacts the formation oil, while at the same time being less dense and less viscous than the reservoir oil but equal or slightly more viscous than formation water at formation pressure and temperature. Suitable solvents for injection include mixtures of hydrocarbons, such as petroleum fractions, as exemplified by gasoline, naphtha, kerosene, gas oils, diesel oils, light crude oil, light refinery cuts, "cutter stock," a refinery product used for thinning fuel oil for ships, aromatic containing condensates, mixed aromatic-paraffinic hydrocarbon materials as are sometimes available as waste streams of refinery operations, and the like. In addition, such solvents may include saturated liquid hydrocarbons having from two to ten carbon atoms in the molecules such as ethane, propane, or LPG, butane, pentane, hexane, cyclohexane octane, nonane, decane, and/or their mixtures with each other. Also aromatic hydrocarbons such as benzene, toluene, xylene and aromatic fractions of petroleum distillates may be used or mixtures thereof. Suitably such solvents may also contain significant quantities of gas dissolved therein such as carbon dioxide which promote diffusion in the reservoir. Gaseous hydrocarbons, e.g., methane, ethane, propane and butane may be used. Carbon dioxide may also be used and is an extremely desirable gas because of its high solubility in hydrocarbons.

From the foregoing specification one skilled in the art can readily ascertain the essential features of this invention and without departing from the spirit and scope thereof can adapt it to various diverse applications. It is our intention and desire that our invention be limited only by those restrictions or limitations as are contained in the claims appended immediately hereinafter below.

What is claimed is:

1. A method for stimulating the recovery of oil having a large fraction of free water flowing from a production well penetrating a subterranean, viscous oil-containing formation consisting essentially of:
   (a) injecting a predetermined amount of a fluid consisting of a solvent into said production well to displace water away from said production well, said solvent having a density and viscosity substantially less than the viscous formation oil and a viscosity equal to or slightly greater than the water at the formation conditions;
   (b) shutting-in said production well for about 1 to about 10 days to allow the formation around said production well to undergo a soak period whereby the injection solvent fingers upwardly under the influence of gravity dissolving in the oil and reducing its viscosity; and
   (c) opening said production well and recovering from said production well fluids, including oil, containing substantially less water than from the unstimulated well.

2. The method of claim 1 wherein steps (a), (b) and (c) are repeated for a plurality of cycles.

3. The method of claim 2 wherein the recovery according to step (c) is continued until the fluid being recovered contains an unfavorable amount of water.

4. The method of claim 3 wherein said solvent is selected from the group consisting of light crudes, light refinery cuts, mixed aromatic-paraffinic condensates and mixtures thereof.

5. The method of claim 4 wherein the amount of solvent injected is from 2 to 30 barrels per foot of productive formation.

6. The method of claim 4 wherein the amount of solvent injected is 20 barrels per foot of production formation.

7. The method of claim 3 wherein the initial soak period is from about 1 to 5 days and subsequent soak periods are from about 5 to 10 days.

8. The method of claim 2 wherein said solvent is one or more saturated liquid hydrocarbon having from two to ten carbon atoms.

9. The method of claim 8 wherein said solvent is selected from the group consisting of ethane, propane, liquefied petroleum gas, butane, pentane, hexane, cyclohexane, octane, nonane, decane, and mixtures thereof.

10. The method of claim 9 wherein the amount of solvent injected is from 2 to 30 barrels per foot of productive formation.

11. The method of claim 10 wherein the amount of solvent injected is 20 barrels per foot of productive formation.

12. The method of claim 2 wherein said solvent is selected from the group consisting of benzene, toluene, xylene, aromatic fractions of petroleum distillates and mixtures thereof.

13. The method of claim 12 wherein said solvent is selected from the group consisting of benzene, toluene, xylene and mixtures thereof.

14. The method of claim 12 wherein the amount of solvent injected is from 2 to 30 barrels per foot of productive formation.

15. The method of claim 14 wherein the amount of solvent injected is 20 barrels per foot of productive formation.

16. A method for stimulating the recovery of oil having a large fraction of free water flowing from a production well penetrating a subterranean, viscous oil-containing formation consisting essentially of the steps of:
   (a) injecting a predetermined amount of a fluid consisting of a solvent containing a gas selected from the the group consisting of carbon dioxide, methane, ethane, propane and butane, into said production well to displace water away from said production well, said solvent having a density and viscosity substantially less than the viscous formation oil and a viscosity equal to or slightly greater than water at the formation conditions;
   (b) shutting-in said production well for about 1 to about 10 days to allow the formation around said production well to undergo a soak period whereby the injected solvent fingers upwardly under the influence of gravity dissolving in the oil and reducing its viscosity; and
   (c) opening said production well and recovering from said production well fluids, including oil, containing substantially less water than from the unstimulated well.

17. The method of claim 16 wherein steps (a), (b) and (c) are repeated for a plurality of cycles.

18. The method of claim 17 wherein said solvent is selected from the group consisting of light crudes, light refinery cuts, mixed aromatic-paraffinic condensates and mixtures thereof.

19. The method of claim 18 wherein the amount of solvent injected is from 2 to 30 barrels per foot of productive formation.

20. The method of claim 19 wherein the amount of solvent injected is 20 barrels per foot of productive formation.

21. The method of claim 17 wherein said solvent is one or more saturated liquid hydrocarbon having from two to ten carbon atoms.

22. The method of claim 21 wherein said solvent is selected from the group consisting of ethane, propane, liquefied petroleum gas, butane, pentane, hexane, cyclohexane, octane, nonane, decane, and mixtures thereof.

23. The method of claim 22 wherein the amount of solvent injected is from 2 to 30 barrels per foot of productive formation.

24. The method of claim 23 wherein the amount of solvent injected is 20 barrels per foot of productive formation.

25. The method of claim 17 wherein said solvent is selected from the group consisting of benzene, toluene, xylene, aromatic fractions of petroleum distillates and mixtures thereof.

26. The method of claim 25 wherein said solvent is selected from the group consisting of benzene, toluene, xylene and mixtures thereof.

27. The method of claim 25 to wherein the amount of solvent injected is from 2 to 30 barrels per foot of productive formation.

28. The method of claim 27 wherein the amount of solvent injected is 20 barrels per foot of productive formation.

* * * * *

UNITED STATES PATENT AND TRADEMARK OFFICE
CERTIFICATE OF CORRECTION

PATENT NO. : 4,560,003

DATED : December 24, 1985

INVENTOR(S) : James M. McMillen and Lynn D. Mullins

It is certified that error appears in the above-identified patent and that said Letters Patent is hereby corrected as shown below:

Col. 3, line 37: "claim 4" should be --claim 5--.

Col. 3, line 38: "production" should be --productive--.

Signed and Sealed this

Fourth Day of March 1986

[SEAL]

Attest:

DONALD J. QUIGG

Attesting Officer

Commissioner of Patents and Trademarks